(12) United States Patent
Gögge et al.

(10) Patent No.: US 8,006,569 B2
(45) Date of Patent: Aug. 30, 2011

(54) MAGNETIC FLOW METER

(75) Inventors: Jörn Gögge, Ober-Floersheim (DE);
Michael Zimmerman, Addison, PA (US); Raymond Pstir, Irwin, PA (US); Roland Stripf, Sembach (DE); Patrick McGrath, Yung Ho (TW)

(73) Assignee: Sensus USA Inc., Raleigh, NC (US)

( * ) Notice: Subject to any disclaimer, the term of this patent is extended or adjusted under 35 U.S.C. 154(b) by 106 days.

(21) Appl. No.: 12/457,483

(22) Filed: Jun. 12, 2009

(65) Prior Publication Data
US 2010/0313675 A1  Dec. 16, 2010

(51) Int. Cl.
*G01F 1/58* (2006.01)
(52) U.S. Cl. .................................. 73/861.12
(58) Field of Classification Search .............. 73/861.12, 73/861.14, 861.08
See application file for complete search history.

(56) References Cited

U.S. PATENT DOCUMENTS

| | | | | |
|---|---|---|---|---|
| 3,274,831 | A | * | 9/1966 | Cushing ..................... 73/861.14 |
| 4,428,241 | A | | 1/1984 | Davis et al. |
| 5,307,687 | A | * | 5/1994 | Arai et al. .................. 73/861.12 |
| 5,852,362 | A | | 12/1998 | Batenburg et al. |
| 6,260,420 | B1 | * | 7/2001 | Ketelsen et al. ........... 73/861.12 |
| 7,251,877 | B2 | | 8/2007 | Thai et al. |
| 7,472,605 | B2 | | 1/2009 | Knill et al. |

FOREIGN PATENT DOCUMENTS
GB          2 403 016 A    12/2004
* cited by examiner

*Primary Examiner* — Jewel Thompson
(74) *Attorney, Agent, or Firm* — Oblon, Spivak, McClelland, Maier & Neustadt, L.L.P.

(57) ABSTRACT

A magnetic flow meter includes a first spud end, a second spud end, and a sensing area positioned between the first spud end and the second spud end. The sensing area has a wall thickness that is thinner than a thickness of the first spud end and the second spud end. The flow meter can be manufactured via molding while a plug is positioned in at least two holes of the magnetic flow meter. The flow meter can also be manufactured to have a near hermetic seal formed by inserting a flexible printed circuit board in a slit of a gasket and then either compressing a register cup surrounding the tube gasket or driving a pin into a center pin around which the tube gasket is positioned.

14 Claims, 12 Drawing Sheets
(7 of 12 Drawing Sheet(s) Filed in Color)

MAGNETIC FLOW METER

BACKGROUND OF THE INVENTION

1. Field of the Invention

The present invention relates to magnetic flow meters and a method of making magnetic flow meters.

2. Description of the Related Art

A conventional utility water meter can include a solid-state flow transducer. Such a flow transducer is a magnetic flow transducer of a kind that is well known and shown by way of example in the cross-sectional view of FIG. 1.

Figure 1:
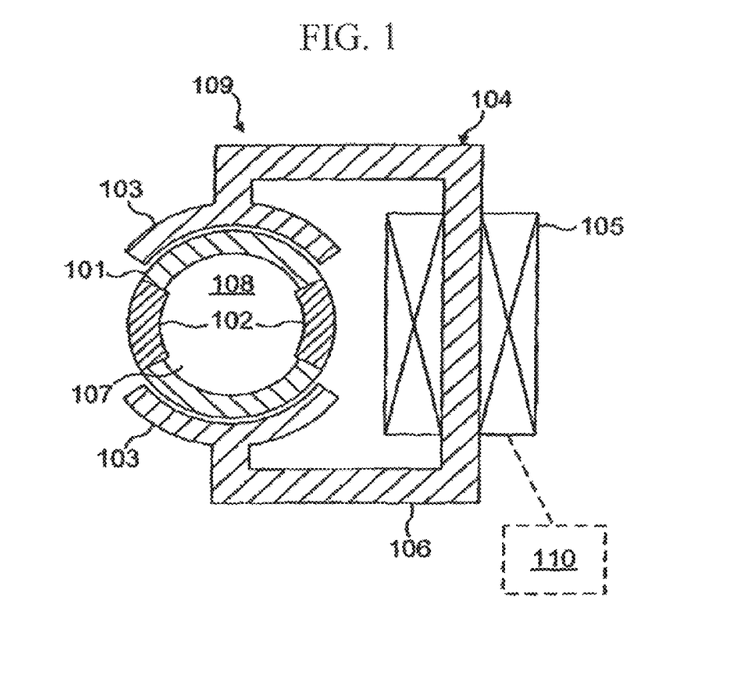
FIG. 1 shows a cross-sectional view of a flow tube equipped with a magnetic flow transducer.

In FIG. 1, a flow tube 101 incorporates a magnetic transducer 109 comprising a pair of electrodes 102 disposed across a diameter of the pipe 101, with at least part of one surface of each electrode 102 in intimate contact with the fluid 108 in the pipe 101. Magnetic pole pieces 103 are disposed across the orthogonal diameter of the pipe 101 and linked by a magnetic circuit 104. As is well known in the art, the magnetic field 107 imparts a force on charged species moving with a bulk medium (ions in the case of water), causing the charged species to migrate in a direction orthogonal to both the magnetic field and the direction of bulk fluid motion. The mutual displacement of oppositely charged species results in an electric field along the direction of migration which builds up until the electrostatic force on a given ion is balanced by the magnetic force. Since the magnetic force depends implicitly on the bulk medium flow velocity, measurement of the opposing electric field (or potential difference) provides a convenient means for determining the flow rate, while integration over time allows the total volume that has passed through the tube to be calculated. Circuitry for processing the electrode signals to obtain such measurements is well known in the art and consequently not described in greater detail here.

As is also well known, it can be advantageous to alternate the applied magnetic field, so as to overcome various limitations of a static field measurement. One such limitation is imposed by the nature of the electrodes used to measure the electrical potential difference in the fluid. An ideal electrode will form a perfect electrical connection to the fluid, with no energy barrier to the exchange of charge either way across the solid-liquid interface.

Figure 2:
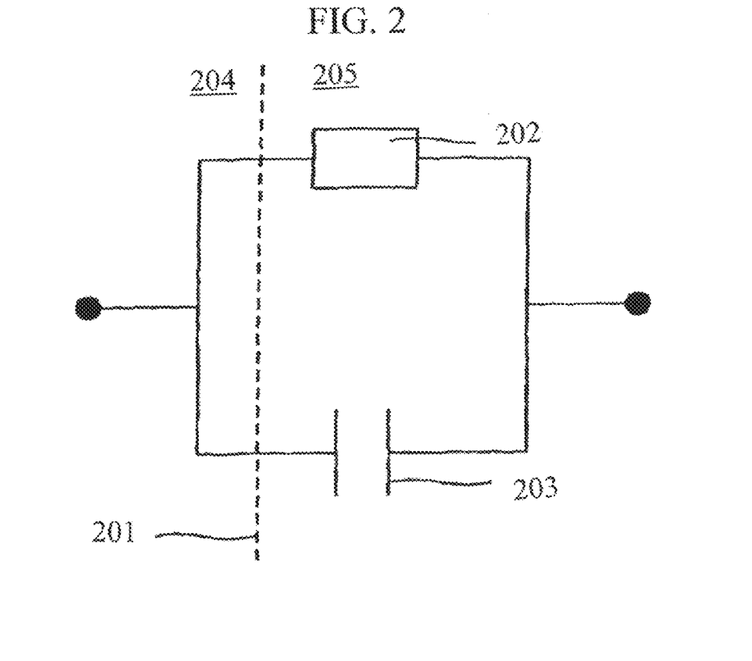
FIG. 2 shows a simple electrical model of the solid-liquid interface.

To understand the frequency-dependent behavior of the electrodes, it is useful to consider a simple electrical model of FIG. 2 that is often applied to the solid-liquid interface 201, consisting of a resistor 202 in parallel with a capacitor 203. The direct exchange of charged species between the solid 204 and the liquid 205 is signified by the flow of current through the resistor 202, while the capacitor 203 represents the tendency of charged species to accumulate in the vicinity of the interface, without actually crossing it. At frequencies substantially above 1 Hz, the capacitor 203 generally provides the easier route for the flow of a small-signal current through a solid-liquid interface.

In the device of FIG. 1, an alternating magnetic field is achieved by means of coils 105 wound around part of the magnetic circuit 104 and supplied with a suitable alternating current waveform. Furthermore, to reduce power consumption, it is known to provide the magnetic circuit 104 with one or more elements 106 exhibiting magnetic remanence so that the coils 105 need only be energized when it is required to change the state of the magnetic field.

Figure 3:
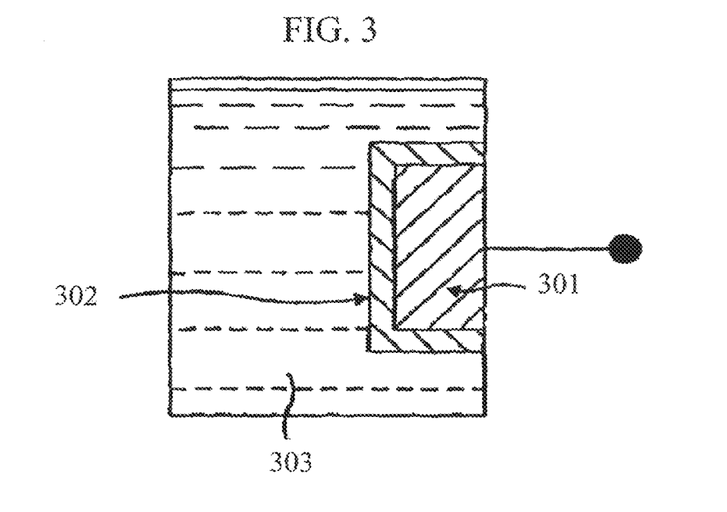
FIG. 3 shows an exemplary electrode.

An exemplary magnetic flow transducer, designed to further reduce power consumption, is described in U.S. Pat. No. 7,472,605, incorporated herein by reference in its entirety. FIG. 3 shows an electrode of a first embodiment of such an exemplary magnetic flow transducer comprising a metal element 301 (e.g. a wire, a plate, or a film completely covering an underlying conductor) coated with an ionic compound 302 of the same metal, which is sparingly soluble in the fluid of the flow to be measured 303.

The metal 301 can be silver, with the accompanying compound 302 being silver chloride. A fully-reversible, galvanic exchange of charge occurs between the fluid 303 and the metal 301 by means of silver ions crossing the phase boundary between the solid silver electrode 301 and the hydrated silver chloride layer 302. The electrical potential across the interface is defined by the Nernst equation, which in turn depends on the surface concentration of AgCl and the liquid concentration of Cl ions. While these quantities will not be constant, they may normally be expected to vary on a timescale much greater than the period of the alternating magnetic field. In accordance with the invention, the timescale of this variation is significantly longer than for an electrode surface which does not possess a controlled ionic exchange mechanism. Accordingly, operation at a lower frequency is facilitated because the noise energy is reduced.

Figure 4:
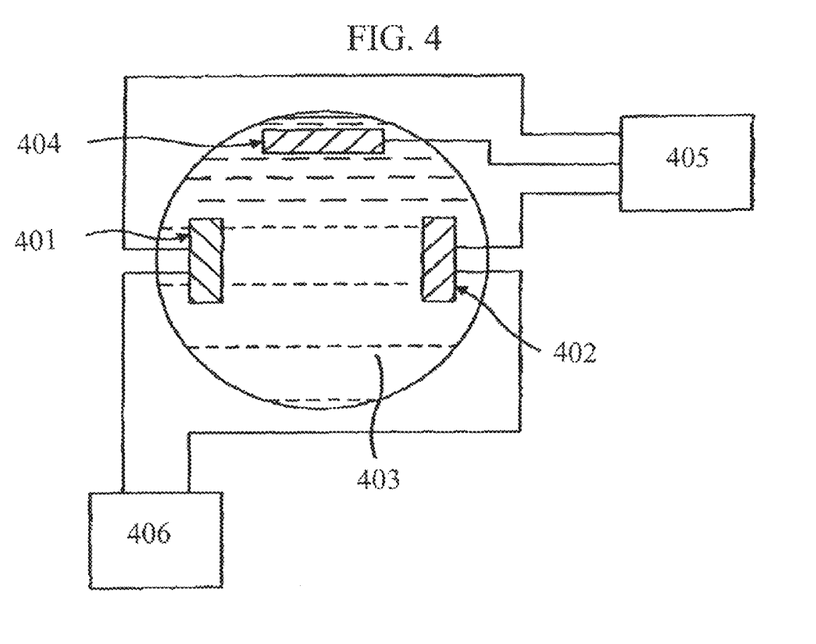
FIG. 4 shows an arrangement of exemplary electrodes.

FIG. 4 illustrates an apparatus for implementing a method for boosting the quantity of ionic compound for situations where spontaneous reactions are insufficient. A third electrode 404 is provided for making contact to the fluid 403, in addition to the measuring electrodes 401 and 402. The third electrode 404 need not be made of the same material as the measuring electrodes 401 and 402 (e.g. graphite or steel would suffice). At intervals determined by control electronics 405, a substantial potential is applied between the third electrode 404, and the measuring electrodes 401 and 402. For the silver chloride system described above, the measuring electrodes 401 and 402 would both be held at a positive potential with respect to the third electrode 404, sufficient to cause a quantity of the silver in the measuring electrodes 401 and 402 to react with negatively charged ionic species in the vicinity. The ionic species would preferably be chloride, and the potential applied between the electrodes may be chosen to favor such a reaction.

Figure 5:
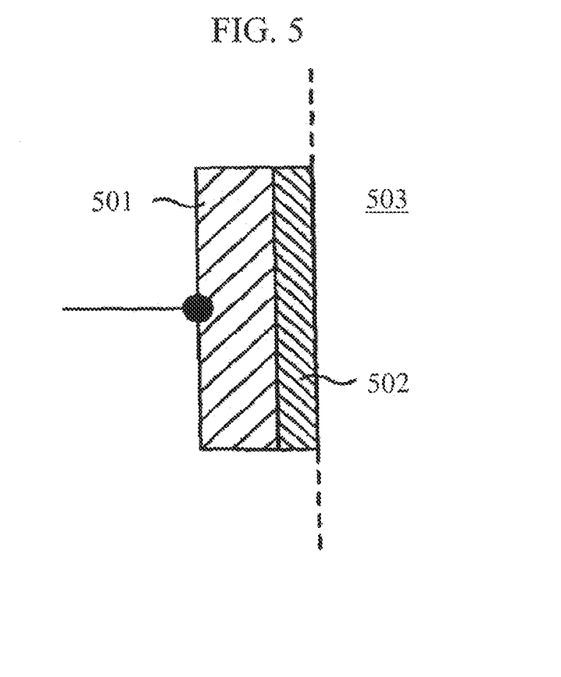
FIG. 5 shows an electrode prepared using the arrangement of FIG. 4.

FIG. 5 shows an electrode prepared using the above method and comprising a flat section of silver 501 coated electrochemically with a thin film of silver chloride 502. Positioned in direct contact with the flowing liquid 503, and preferably flush with the wall of the flow tube so as to reduce turbulence and the corresponding measurement noise and uncertainty, its surface will tend to be abraded over time by particulates in the liquid, thereby helping to maintain an active electrode surface.

SUMMARY OF THE INVENTION

A magnetic flow meter comprises a first spud end having a first wall thickness, a second spud end having a second wall thickness, and a sensing area positioned between the first spud end and the second spud end. The sensing area has a third wall thickness that is thinner than the first wall thickness and the second wall thickness.

A method of manufacturing a magnetic flow meter comprises providing a mold for a tube of the magnetic flow meter, inserting a plug in at least two holes of the magnetic flow meter, and molding the tube while the plug is positioned in each of the at least two holes of the magnetic flow meter.

A method of manufacturing a magnetic flow meter comprises attaching a flexible printed circuit board to an electrode of the magnetic flow meter, inserting the flexible printed circuit board in a gasket, sliding the gasket having the flexible printed circuit board inserted therein onto a center pin, sliding the gasket having the flexible printed circuit board inserted therein into a register cup, and deforming either the center pin or the register cup to compress the gasket to seal the flexible printed circuit board with a near hermetic seal.

BRIEF DESCRIPTION OF THE DRAWINGS

The patent or application file contains at least one drawing executed in color. Copies of this patent or patent application publication with color drawing(s) will be provided by the office upon request and payment of the necessary fee.

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Referring now to the drawings, wherein like reference numerals designate identical or corresponding parts throughout the several views.

Figure 6:
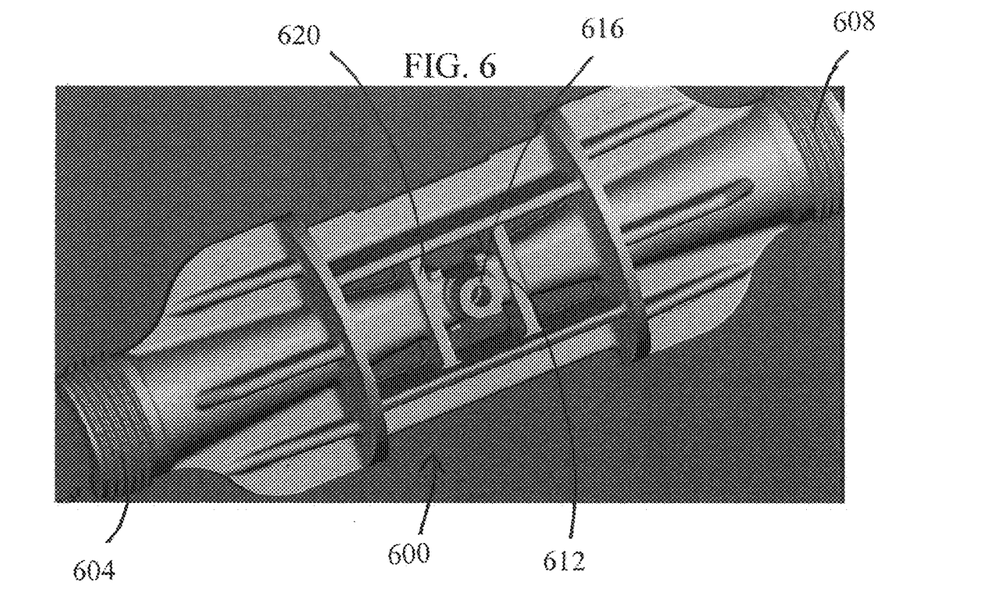
FIG. 6 shows an exemplary embodiment of a flow tube for a flow meter.

FIG. 6 shows an exemplary embodiment of a magnetic flow meter 600. The flow meter 600 includes a first spud end 604 and a second spud end 608 that can each include threading, or an alternative connecting means, to allow the flow meter to be connected along a water line, for example, to measure water used by a residential water system. Beyond the residential water system, the flow meter 600 could have utility for other measurement applications where compatibility is demonstrated. Thus, the flow meter described herein should not be limited to measuring water in a residential water system.

Figure 7:
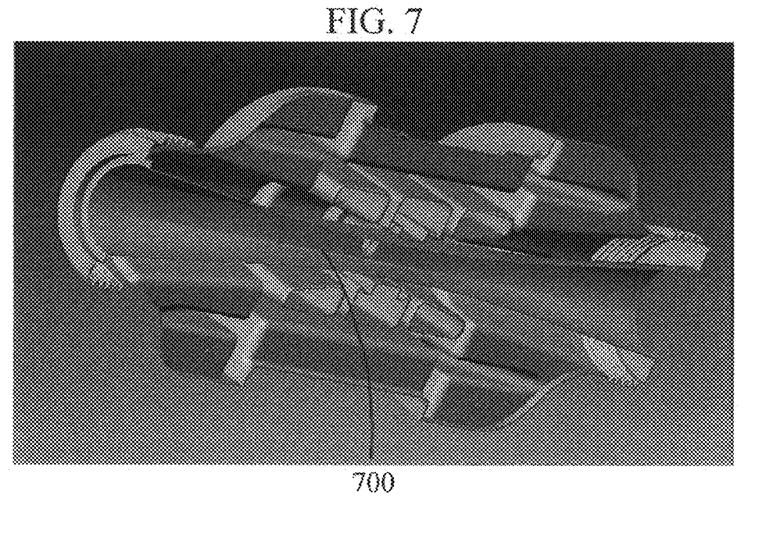
FIG. 7 shows a sectional view of an exemplary embodiment of a mold from which a flow meter can be made.

The sensing area 612 is positioned between the spud ends 604, 608. FIG. 7 shows a sectional view, taken along a plane that is parallel to the direction of flow within the flow meter 600, of a mold 700 from which a flow meter can be made. As can be seen from FIG. 7, the sensing area 612 of the flow meter 600 made from the mold 700 has a very thin wall section compared with the thick walls at the spud ends 604, 608. The thick walls of the spud ends 604, 608 could have a same or a different thickness. The thin wall section allows two magnet pieces (for example, 816, 820 in FIG. 8) positioned outside of the thin walls to be very close to the water flowing through the flow meter 600 for better accuracy and lower power consumption. In an exemplary embodiment, the thin walls can have a thickness of $60/1000$ in. (approximately 2 mm) at a center of the sensing area 612 versus a thickness of $150/1000$ in. (approximately 4 mm) for the spud ends 604, 608. Thus, the thickness of the thin walls of the sensing area 612 is equal to or less than half of the thickness of the walls of the spud ends 604, 608. By thinning the walls of the sensing area 612 in comparison to the thick walls of the spud ends 604, 608, the power requirements for driving the drive coils which apply a current to the magnet pieces is reduced. Thus, in an exemplary embodiment in which the drive coils are powered by a battery, the life of the battery can be extended by the thin walls. Alternatively, the flow meter 600 could be powered by other known power sources such as solar power or from the water flowing through the flow meter 600, etc.

Figure 11:
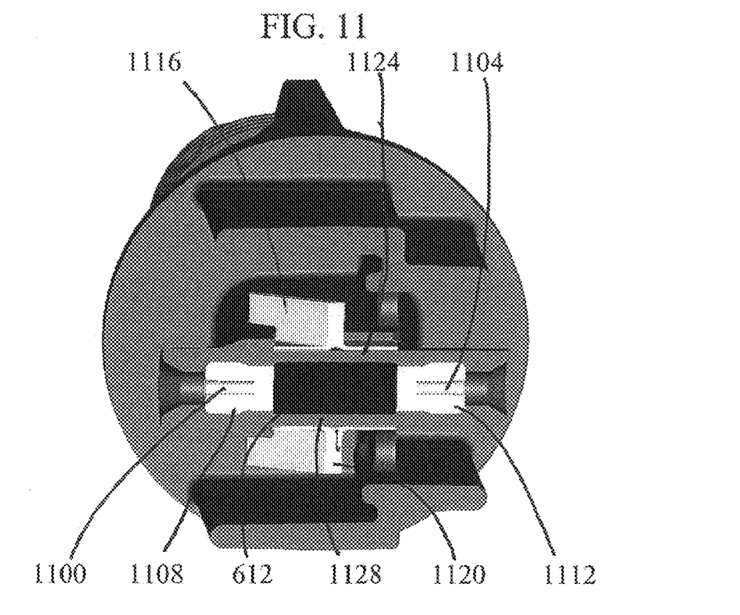
FIG. 11 shows a sectional view of an exemplary embodiment of a flow meter.

Additionally, supporting walls 620 can be provided around the sensing area 612 to help distribute the load from the water flowing through the flow meter 600 in the sensing area 612. Further, in an exemplary embodiment, the wall thickness around one of the electrodes (described below) is thinner than the opposing wall around the other electrode because the tool surface which forms the pole piece area has to slide over the wall. Specifically, as can be seen in FIG. 11, each of the electrodes 1100, 1104 is held by a respective graphite plug 1108, 1112. The graphite plugs 1108, 1112 have a diameter at a surface that is exposed to the water that is nearly equal to the height of the sensing area 612. To prevent the graphite plugs 1108, 1112 from sliding into the flow tube, the diameter of the graphite plugs 1108, 1112 is increased at a portion of the graphite plugs 1108, 1112 that is not exposed to the water. An outside diameter of the wall of the sensing area 612 is limited at the sections 1124, 1128 that are in contact with the pole pieces 1116, 1120. Because the mold which forms the flow tube must be opened and pass over at least one of the electrodes (electrode 1112 in this example), the wall thickness of the wall surrounding electrode 1112 can be no thicker than the wall at sections 1116, 1120. Thus, the parting line from the mold opening can be positioned at one side of the sensing area 612 such that the part of the mold that shapes the sections 1124, 1128 are removed over only one of the electrodes. Accordingly, the wall thickness around one of the electrodes (electrode 1112 in this example) is thinner than the opposing wall around the other electrode. Thus, a higher stress is created around the electrode with the thin wall. To compensate for the higher stress, the supporting walls 620 may not be symmetrical to provide more support to the electrode with the thin wall.

Polymer surfaces have a measurable property called "Zeta Potential" which describes its surface charge property. The magnitude of this property has a bearing on how the polymer surface interacts with its surroundings, such as water in an exemplary embodiment in which the polymer surface is an inside of a flow tube of a flow meter measuring water flow. When water flows across a polymer surface, fixed charges on the solid polymer surface will interact with opposite charges in the flowing water. The charges in the water will tend to migrate towards the polymer charges creating a streaming ion current and potential. This streaming ion current can interfere with the measurement signal generated by electrodes of the flow meter. Accordingly, selection of a flow tube polymer that has a low surface charge characteristic is beneficial and provides the least possible interference with the measurement signal. Thus, the tube of the flow meter 600, which includes both the spud ends 604, 608 and the sensing area 612, can be made of a material selected to improve the performance of the flow meter 600 by mitigating streaming ion potential effects that have a bearing on the noise and accuracy of the flow meter 600. Such a material can be Xtel (TRADEMARK), which is a polyphenylene sulfide (PPS) alloy, produced by Chevron Phillips Chemical Company. For example, Xtel (TRADEMARK) XE5030 may be selected as a suitable material for the flow tube and it also has desirable mechanical properties, such as a tensile strength of 21 Ksi, a flexural strength of 31 Ksi, and water absorption of 0.05%@23 degrees Celsius over 24 hrs. A list of the properties of Xtel (TRADEMARK) XE5030 can be found on Chevron Phillips Chemical Company's website, for example, at cpchem.com/enu/tds_xe5030.asp. The flow tube could be made of alternative materials, including polymers such as a PPE+PS blend, PPO, SPS, PBT, or PP, which may also provide little interference with the measurement signal. Further, as the Zeta Potential property is important on an inside surface of the flow tube, in an alternative embodiment, the flow tube may be comprised of a polymer or other material without Zeta Potential as long as a surface of the inside of the flow tube is finished with a Zeta Potential material.

In an exemplary embodiment, an interior passage for the water in the sensing area 612 can be square, whereas the interior passage through the spud ends 604, 608 can be round. Alternatively, the interior passages of the spud ends 604, 608 and/or the sensing area 612 could be other shapes, such as square, rectangular, or round.

The flow meter 600 includes two openings 616 that are positioned across the sensing area 612 from one another. Further, an electrode (described below) can be positioned in each of the openings 616.

Figure 8:
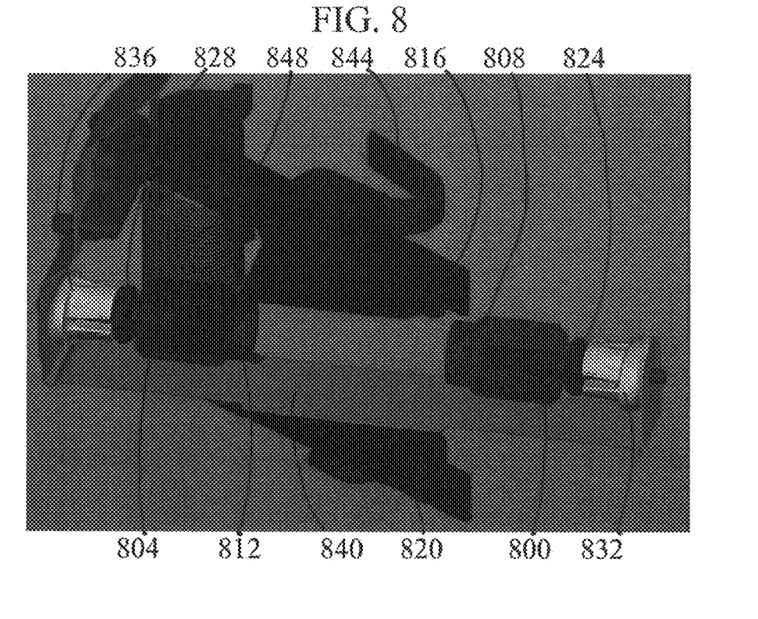
FIG. 8 shows an exemplary embodiment of an electrode construction.

An exemplary embodiment of electrodes 800, 804 to be used with the flow meter 600 can be seen in FIG. 8. The electrodes 800, 804 can each include a silver chloride pellet and a silver pin. The silver pin can be a piece of conventional machining wire. The electrodes can be held by graphite plugs 808, 812. Alternatively, another porous material could be used for the plugs, such as ceramics, glass frits, or various membrane materials.

Figure 12:
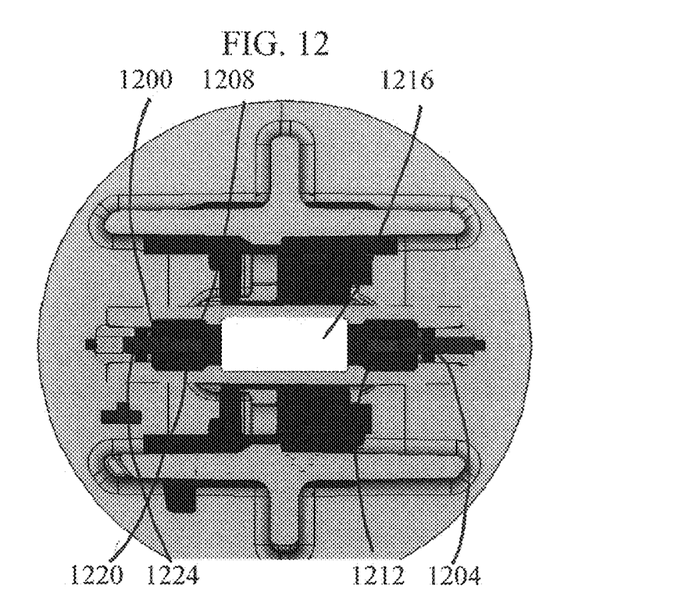
FIG. 12 shows a sectional view of another exemplary embodiment of a flow meter.

FIG. 12 shows a sectional view, taken along a plane that is perpendicular to the direction of flow within the flow meter 600, of an exemplary embodiment in which a first electrode 1200 is held within a first graphite plug 1208 and a second electrode 1204 is held within a second graphite plug 1212. The graphite plugs 1208, 1212 are positioned between the electrodes 1200, 1204 and the inside of the flow tube 1216 such that the electrodes 1200, 1204 are not in direct contact with water flowing in the inside of the flow tube 1216. In the exemplary embodiment shown in FIG. 12, the electrode 1200 includes a silver chloride pellet 1220 and a silver pin 1224.

Such an assembly provides a consistent chemistry that can create an electrode for the flow meter 600 that can last for more than 20 years. Specifically, silver/silver chloride electrodes can be used such that as the electrode functions there is a reversible exchange of silver and chloride ions and technically a mass balance is achieved (meaning there is no net loss of the silver or silver chloride from the equilibrium standpoint). The silver chloride however has a very low solubility in water, and over time loss of silver chloride can occur by diffusion through the graphite into the water stream. Accordingly, the graphite plugs 808, 812 can be designed with a minimum thickness from the flowing water, for example 3 mm, to reduce the diffusion rate of the silver chloride pellet into the water stream. The silver chloride pellets' weight or the mass of silver chloride can also be calculated so that, based on the diffusion rate of the material, it will not be completely dissolved during the lifespan of the meter and beyond. Thus, unlike conventional electrodes which can have a life expectancy problem when their electrolytes are not replaced, the electrodes described herein can last the lifespan of the meter and beyond.

Additionally, the graphite plugs 808, 812 can work as a filter between the silver chloride of the electrodes 800, 804 and the water in the flow meter 600. Thus, the graphite plugs 808, 812 can protect the elements of the electrodes 800, 804 from potential degradation effects arising from any debris or particulate that may be in the water stream and, at the same time, allow for free ion transfer into the electrodes 800, 804. The flow meter 600 can also include a seal, such as an O-ring seal 824, 828 positioned between the electrodes 800, 804 and the electrode caps 832, 836. FIG. 8 also shows a flexible printed circuit board 840 (described later). Further, a magnetic retainer 844 holds the magnet pieces 816, 820 and a magnetic drive coil 848 powers the magnetic pieces 816, 820.

The graphite plugs 808, 812 can be molded with the tube of the flow meter 600 to create a one-piece flow tube with a built-in feature in which to create electrodes. The molding can be injection molding, for example. Other molding processes could also be used, for example, compression molding, vacuum molding, or fusible core injection molding. Thus, the insert molded graphite plugs 808, 812 can have a perfectly flush face exposure to the water stream inside of the flow meter 600 to ensure no flow disturbance.

After the molding, a hole can be bored in each of the graphite plugs 808, 812 such that the silver chloride pellet and silver pin can be simply pressed into the bore, representing a cost savings over conventional assembly methods. Alternatively, the hole can be bored in each of the graphite plugs 808, 812 before the molding or the hole can be formed during the molding of the graphite plugs 808, 812 themselves. Thus, the graphite plugs 808, 812 can have a cylindrical shape with a cavity for the silver chloride pallet and the silver pin of the electrodes 800, 804. The cylindrical shape of the graphite plugs 808, 812 allows commonly produced graphite rod stock to be used to help lower costs. Alternatively, different shapes could be used for the graphite plugs 808, 812.

In an exemplary embodiment, the silver pin can undergo conversion coating after it is machined. Conversion coating is an electrolytic process much like electroplating in which the silver metal surface is anodized (oxidized) to form a thin layer of silver chloride (AgCl). The "conversion" refers to the coating formed (in which silver is converted to silver chloride) by way of silver ions reacting with free chloride ions to form insoluble silver chloride ($Ag^+ + Cl^- \rightarrow AgCl$). The process can be done by immersing the tip of the silver pin in a dilute solution of hydrochloric acid (HCl) or other suitable chloride solution such as NaCl or KCl. The pin is connected to a controlled power supply in which the silver pin is made the anode (positive electrode) against the cathode (negative electrode). The cathode can be made of silver or be an inert electrode material such as platinum or carbon, etc. An electrical potential is applied creating current flow. Silver ions which are produced at the pin surface react with chloride ions in the HCl solution to form a layer of insoluble silver chloride (AgCl) on the silver (Ag) pin. After a specified amount of coulombs of electrical current are passed, the electrode is removed from contact with the HCl and rinsed with DI water and dried. The conversion is present as a grayish coating on the silver pin. The pin may be further processed at this stage to desmut the surface by ultrasonically cleaning the conversion coated pin with concentrated ammonium hydroxide until a yellow-white layer of AgCl is revealed.

Further, before being inserted into the mold, the graphite plugs 808, 812 can undergo ionic salt impregnation. To help facilitate electrode ion transfer and to create chloride ion activity inside the Ag/AgCl electrode to aid wetting, the porous graphite component of the electrode can be impregnated with an ionizable salt, in this case potassium chloride (KCl). Other chloride salts could work, including ordinary sodium chloride (NaCl) or other salts. The ionic impregnation process involves immersing the porous graphite electrode components in a solution of 0.1 molar potassium chloride inside a vacuum flask. A high vacuum (29"+mercury vacuum) is applied to the sealed flask containing the graphite and KCl solution. This high vacuum causes free air inside the porous graphite to effuse out of the graphite in the form of air bubbles which are vented out of the flask via the vacuum pump. After a time, the vacuum is released causing the KCl solution to infuse into the graphite. The process is repeated to insure that as much air as possible has been displaced by the KCl solution. The wet graphite pieces are removed from the flask, patted dry with clean toweling, and then completely dried inside a forced air oven. The processed graphite at this point has been impregnated with solid crystals of potassium chloride throughout its porous matrix.

An electrode including a conversion coated silver pin positioned in an ionic salt impregnated graphite plug, that has under gone a vacuum treatment that is described below, can improve the electrode performance by reducing wetting time and/or reducing offset potentials and associated noise levels that affect the accuracy of the flow meter. For example, in such a modified flow meter 600, the electrodes 800, 804 can stabilize and provide low noise readings in minutes versus a conventional flow meter which can take days or a week to achieve the same result.

A printed circuit board can connect the magnetic drive coil 848 and the electrodes 800, 804 to a register, including a battery, a printed circuit board assembly, and a display device. Firmware on the printed circuit board assembly can control the magnetic drive coil 848 to create a magnetic field and the electrodes measure the electric offset and firmware on the printed circuit board assembly can translate signals from the electrodes into a flow rate of water in the flow tube. Such firmware can be firmware that is well known to a person of ordinary skill in the art, and thus is not described further herein.

Figure 9:
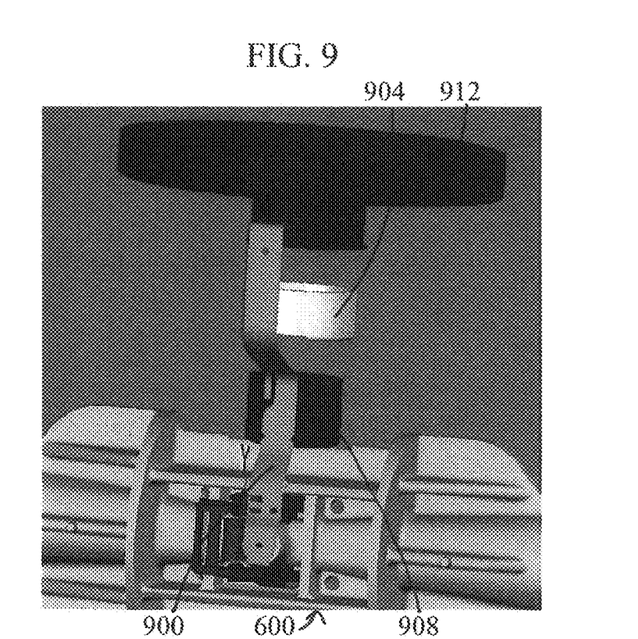
FIG. 9 shows an exemplary embodiment of a flexible printed circuit board and a seal.
Figure 13:
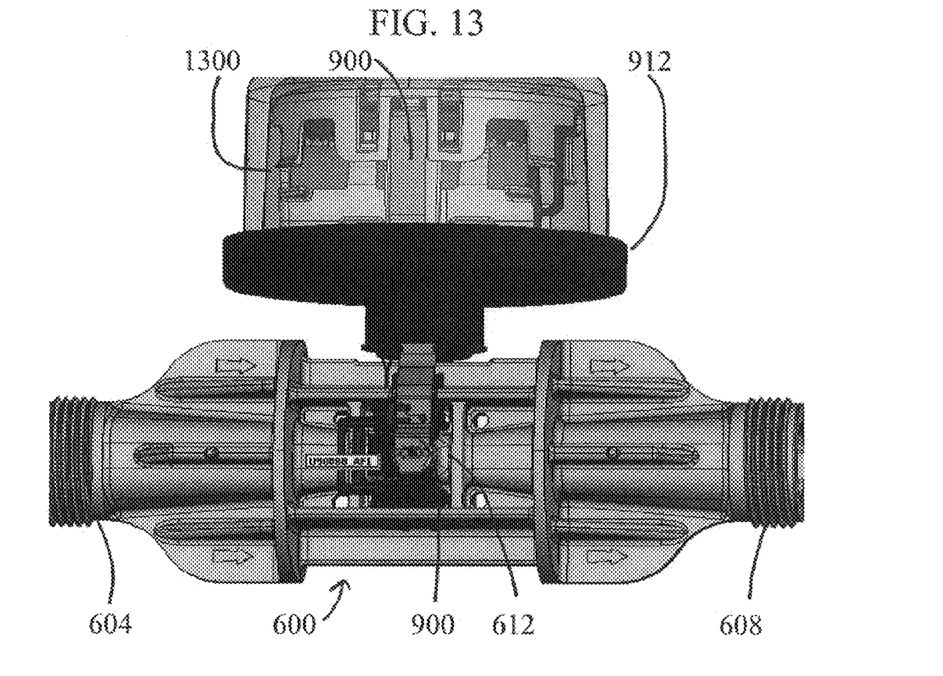
FIG. 13 shows an exemplary embodiment of a flow meter having a register attached thereto.

In an exemplary embodiment, the printed circuit board is a flexible printed circuit board 900, as shown in FIG. 9. Ends of the electrodes 800, 804 can be attached to the flexible printed circuit board 900. The other end of the flexible printed circuit board 900 can be connected to a printed circuit board assembly and sealed with a near hermetic seal inside the register (1300 in FIG. 13). The part of the flexible printed circuit board 900 that is connected to the magnetic drive coil 848 and electrodes 800, 804 can be sealed, for example, by a reaction injection molding (RIM) process discussed below.

Figure 20:
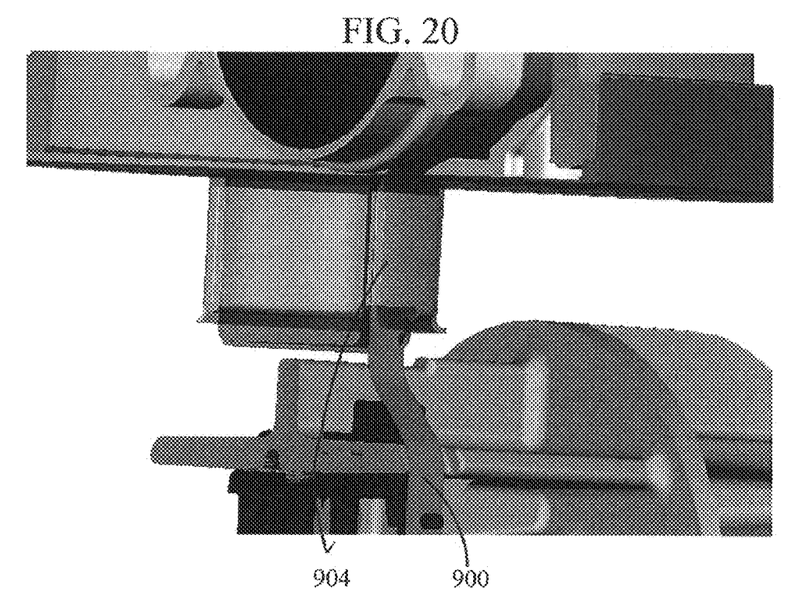
FIG. 20 shows an exemplary embodiment of a flexible printed circuit board positioned in a gasket.

It can be desirable to create as near a hermetic seal as possible around the flexible printed circuit board 900 to provide a water barrier and to maximize resistance to moisture ingress into the sealed register environment containing the main printed circuit board assembly. This provides a suitable environment for an unprotected printed circuit board assembly to survive the 20 year life expectancy. To create the near hermetic seal, in an exemplary embodiment, the flexible printed circuit board 900 is passed through a slit in a tube gasket 904, as can be seen, for example, in FIG. 20. Thus, the flexible printed circuit board 900 is sandwiched by two layers of the tube gasket 904. The tube gasket 904 can be a single piece that is rolled or a two or more piece gasket. The tube gasket 904 having the flexible printed circuit board 900 passing therethrough is slid onto a center pin 908. The center pin 908 can be a hollow cup of metal. The center pin 908 can be made out of most any corrosion resistant and malleable metal, such as stainless steel or copper, for example. Then, this assembly is slid into a register cup 912 that can also be a hollow cup of metal. The register cup 912 can also be made out of most any corrosion resistant and malleable metal. Alternatively, the assembly of the tube gasket 904 and the flexible printed circuit board 900 can be slid into the register cup 912 and then slid onto the center pin 908.

Next, a drive pin (not shown) can be driven into the center pin 908 to expand the center pin 908, thereby compressing the tube gasket 904 to create a near hermetic seal. Alternatively, the register cup 912 can be crimped to also compress the tube gasket 904 to create the near hermetic seal. Thus, only the thickness of the layered tube gasket 904 needs to be compressed to create the near hermetic seal. Accordingly, less movement of metal is required to create the near hermetic seal. For example, if the layered gasket 904 measures 0.08" total thickness and 20% of that thickness is compressed to create the near hermetic seal, such a compression distance is much less then trying to compress ~20% of a 0.5" diameter plug to create the seal. Accordingly, the near hermetic seal described above is significantly easier to create than conventional seals. Further, the assembly described above provides a near hermetic seal that is superior to the seal provided by conventional potting or molding methods. It should be noted that the process of creating a near hermetic seal utilizing the rubber gasket and a flexible printed circuit board can be used in any area where it is desirable to pass the flexible printed circuit board into a sealed environment and should not be limited to flow meters.

After the flexible printed circuit board 900 is sealed, all electrode components can be capsulated via a reaction injection molding (RIM) process. In an exemplary RIM process, the pre-RIM meter assembly is loaded into a RIM mold designed to accommodate the meter. This mold can be oriented in such a way as to aid in evacuation of air pockets to ensure a more void free overmolding. This orientation can vary based on the tool design as well as the pre-RIM assembly design. A two part urethane mixture, for example, can be injected into the cavity of the mold at ~200 grams per second with an impingement pressure of ~2200 psi and could vary based on the material selection and part design. The overmolded unit is left in the mold for ~1 minute to ensure sufficient cure time before removal.

Figure 10:
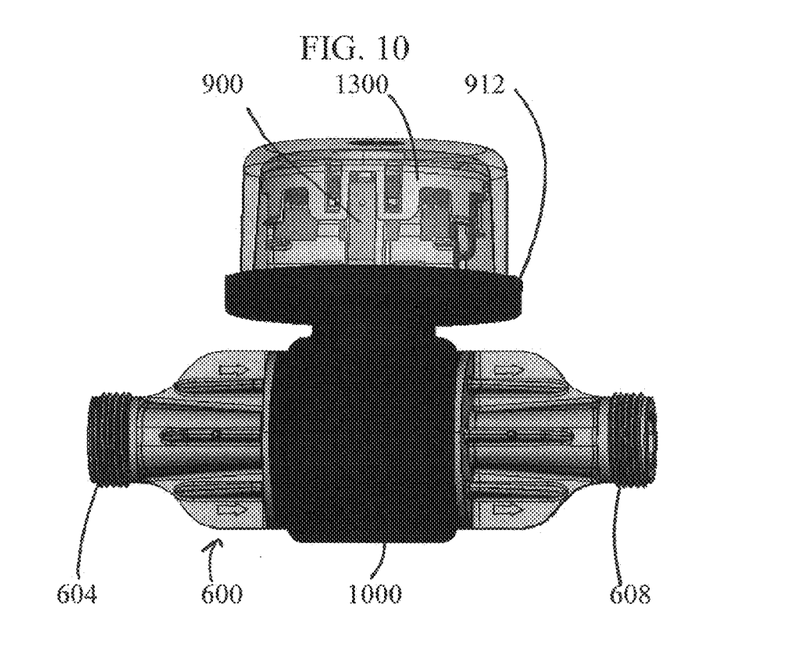
FIG. 10 shows an exemplary embodiment of a flow meter having under gone an RIM process.

FIG. 10 shows the flow meter 600 having undergone the RIM process. The RIM process can be used to rapidly capsulate the magnetic components with a capsulating material 1000, such as urethane, which can optionally include mica filler. The mica filler can increase the strength of the urethane as well as reduces its moisture absorption. The injection time of the RIM process can take about 1-1.5 seconds to complete, with a de-mold time of about 1 minute. Further, the RIM process only requires a low process temperature and pressure, and thus is less likely to damage components of the flow meter 600. Conventional methods of potting the electrode components can take as little as 2 minutes and can take up to 10 minutes or more depending on the material used. The conventional material can then have a cure time from as little as 10 to 15 minutes, up to possible cure times of a day or longer. Thus, potting the electrode components requires a substantially longer manufacturing time compared with the RIM process.

After the RIM process, the vacuum treatment mentioned above can be performed. To perform the vacuum treatment, a liquid such as water is injected into the flow tube 600 and a vacuum is placed on the water to evacuate air out of the graphite plugs 808, 812, thereby reducing spurious noises from the electrodes 800, 804 in the graphite plugs 808, 812. Thus, as discussed above, the electrodes 800, 804 can stabilize and provide low noise readings much more quickly than conventional electrodes.

Figure 14:
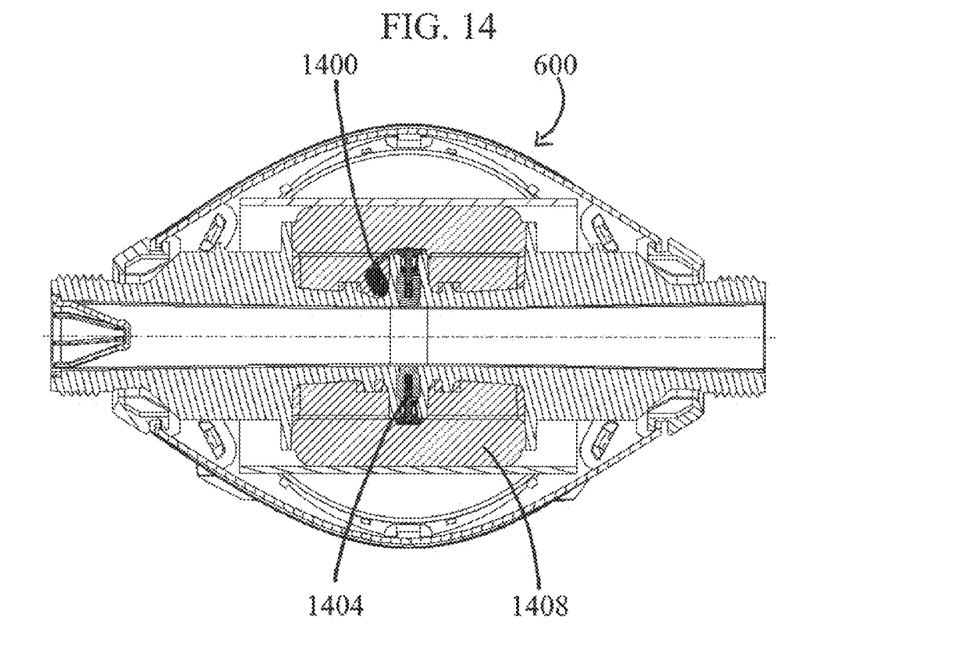
FIG. 14 shows a sectional view of another exemplary embodiment of a flow meter.

FIG. 14 shows a sectional view of another exemplary embodiment of a flow meter 600. The flow meter 600 shown in FIG. 14 includes a drive coil 1400 and a pair of silver/silver chloride electrodes 1404. Further, the flow meter 600 shown in FIG. 14 includes a complete encapsulation 1408 of the magnetic components.

Figure 15:
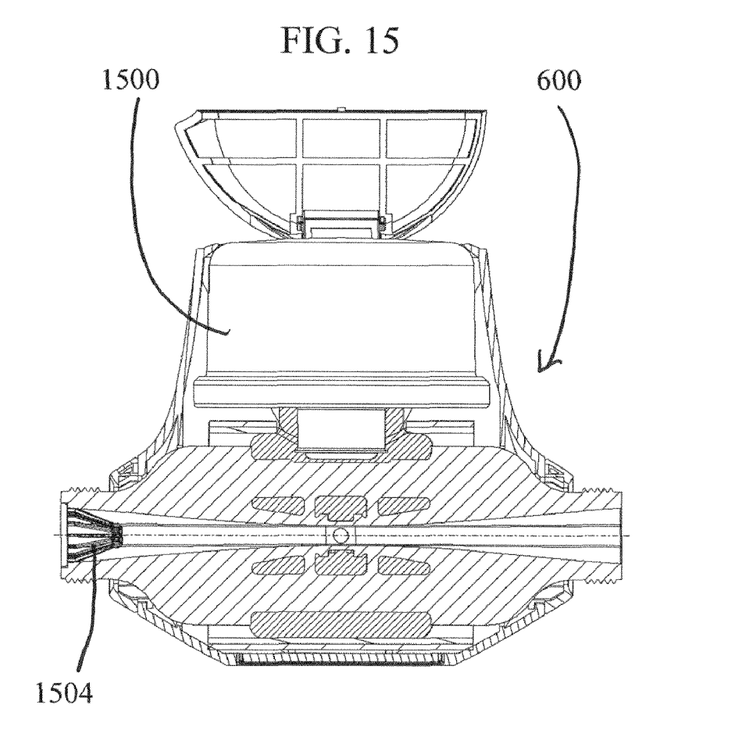
FIG. 15 shows an exemplary embodiment of a flow meter having a register attached thereto.

FIG. 15 shows an exemplary embodiment of a flow meter 600 having a register 1500 attached thereto. The flow meter 600 also includes a strainer 1504 positioned within a spud end at an inlet side of the flow meter 600. Such a strainer 1504 can prevent objects of a predetermined size from passing through the flow meter 600 and possibly becoming lodged in the sensing area 612.

Figure 16:
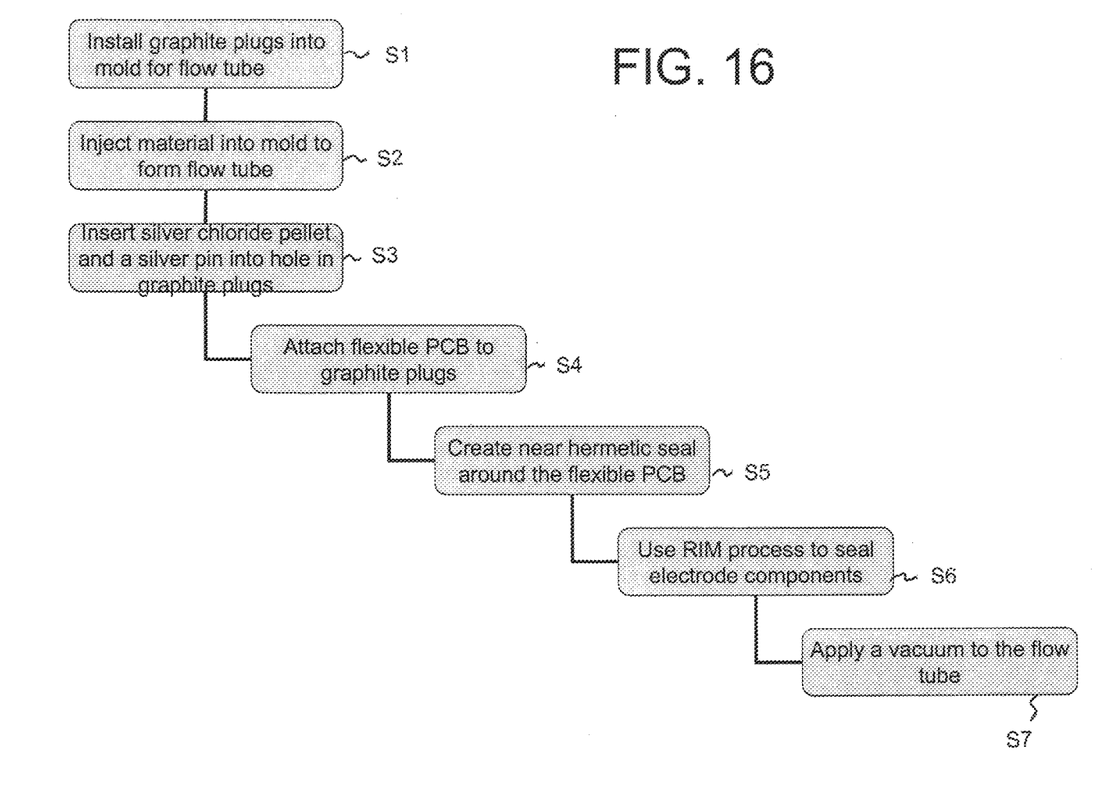
FIG. 16 shows a flow chart of an exemplary method of manufacturing the flow meter.

FIG. 16 shows a flow chart of an exemplary method of manufacturing the flow meter. The steps listed below are consistent with the more detailed description provided above. Specifically, in step S1, graphite plugs are installed into a mold for a flow tube. In step S2, material as described above is injected into the mold to form the flow tube. Next, in step S3, a silver chloride pellet and silver pin are inserted into a hole in each of the graphite plugs. A flexible printed circuit board is attached to each of the graphite plugs in step S4. Then, in step S5, a near hermetic seal is created around the flexible PCB. After the near hermetic seal is created, a RIM process is used to seal the electrode components in step S6. Finally, a vacuum is optionally applied to a flow tube in step S7. It would be obvious to a person of ordinary skill in the art after reading the entire written description herein that some of these steps could be performed in a different order. For example, the silver chloride pellet and silver pin could be inserted into the graphite plugs before the flow tube is molded. Additionally, the method should not be limited to these recited steps as further embodiments have also been described herein. For example, the flow tube can be formed by other molding methods besides injection molding.

Figure 17:
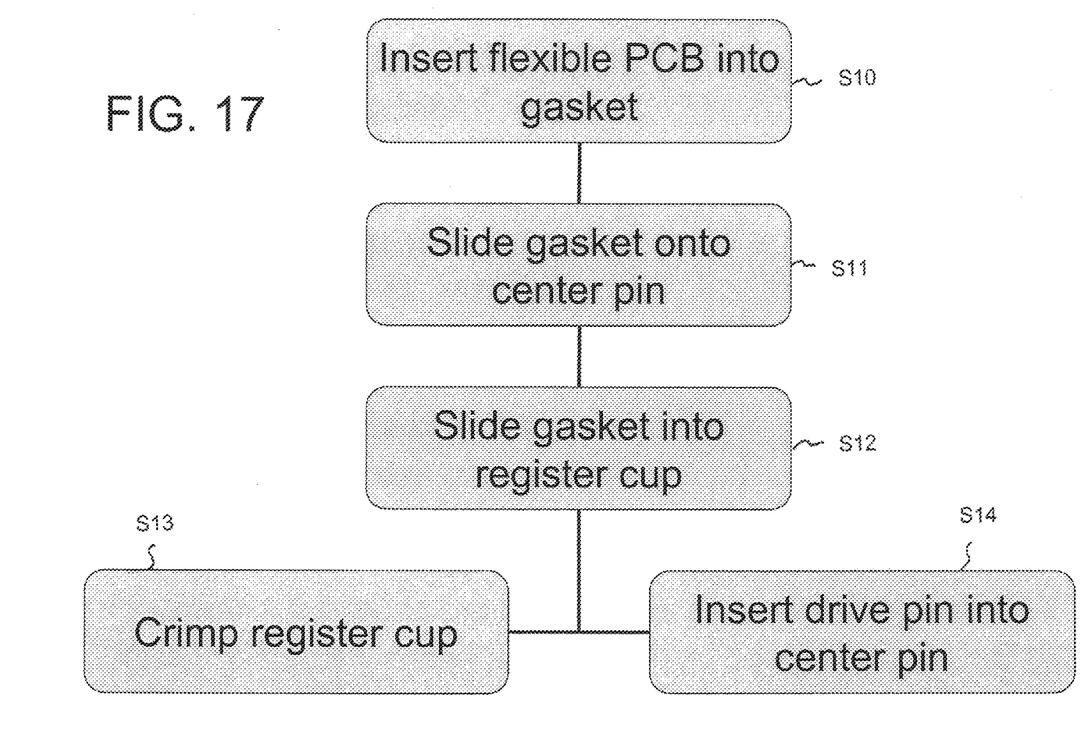
FIG. 17 shows a flow chart of an exemplary method of creating a near hermetic seal for the flexible printed circuit board of the flow meter.

FIG. 17 shows a flow chart of an exemplary method of creating a near hermetic seal around the flexible printed circuit board of the flow meter. The steps listed below are consistent with the more detailed description provided above. In step S10, a flexible printed circuit board is inserted into a gasket. Next, in step S11, the gasket having the printed circuit board therein is slid onto a center pin. The gasket, flexible printed circuit board, and center pin assembly is then slid into a register cup in step S12. Then, to complete the near hermetic seal, the register cup is crimped in step S13 or a drive pin is inserted into the center pin in step S14. Alternatively, both steps S13 and S14 can be performed to complete the near hermetic seal by compressing the gasket. It would be obvious to a person of ordinary skill in the art after reading the entire written description herein that some of these steps could be performed in a different order. For example, the register cup having the flexible printed circuit board inserted therein could be slid into the register cup and then slid onto the center pin. Additionally, the method should not be limited to these recited steps as further embodiments have also been described herein. For example, the gasket could be a two-piece gasket that is formed around the flexible printed circuit board.

Figure 18:
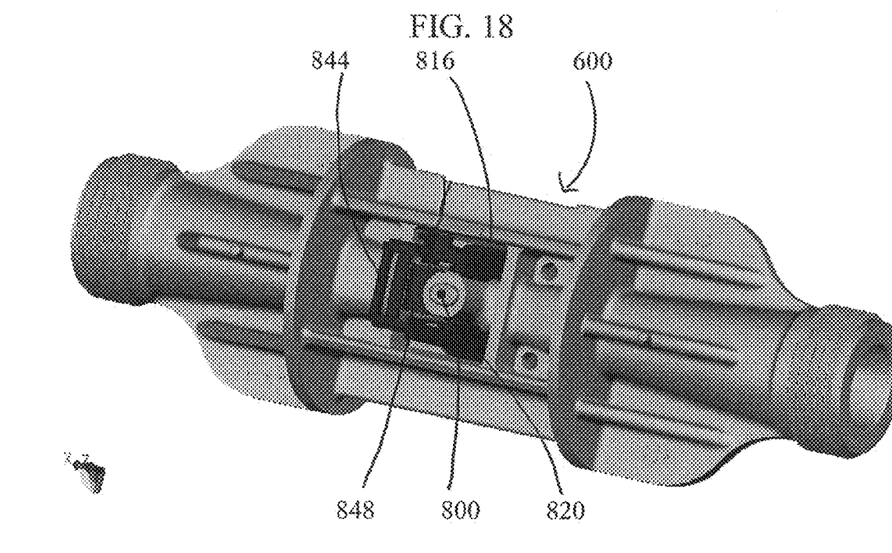
FIG. 18 shows an exemplary embodiment of a flow meter.
Figure 19:
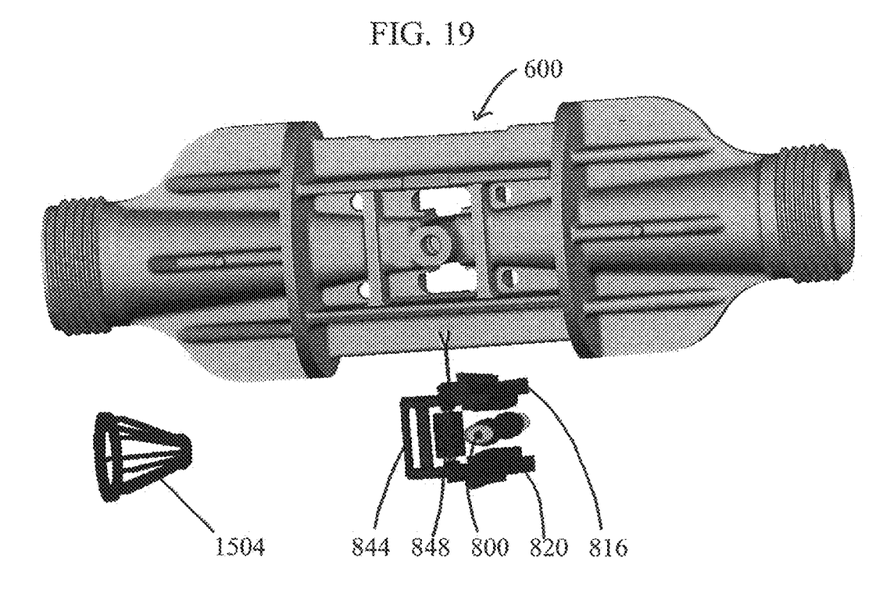
FIG. 19 shows another exemplary embodiment of a flow meter.

FIG. 18 shows an exemplary embodiment of a flow meter 600 having the electrodes 800, 804, the drive coils 848, the magnetic pieces 816, 820, and the magnetic retainer 844 installed thereon. FIG. 19 shows another exemplary embodiment of a flow meter 600 with the electrodes 800, 804, the drive coils 848, the magnetic pieces 816, 820, the magnetic retainer 844, and the strainer 1504 not installed on the flow tube.

Figure 21:
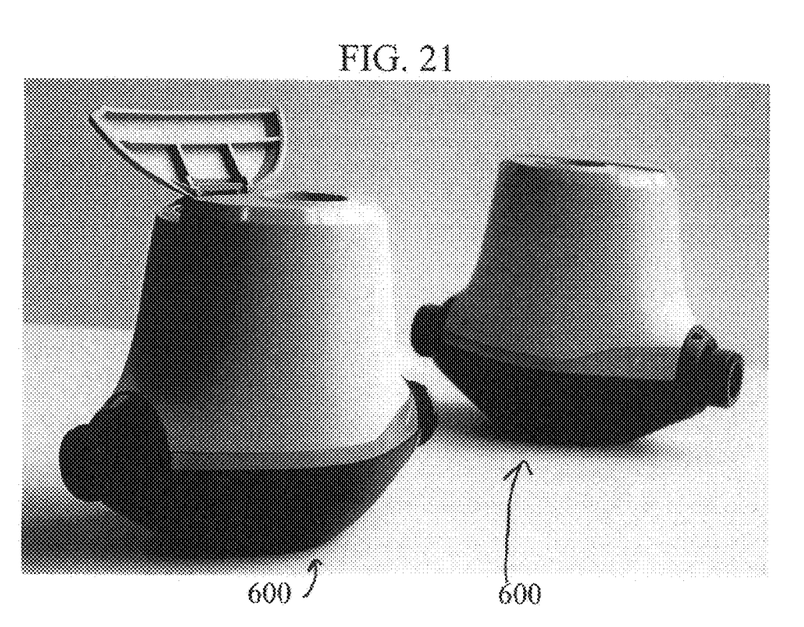
FIG. 21 shows an exemplary embodiment of a flow meter.

FIG. 21 shows an exemplary embodiment of flow meters 600 having an outer casing added thereto. Such flow meters 600 can be directly installed into a residential water system, for example.

Numerous modifications and variations of the present invention are possible in light of the above teachings. It is therefore to be understood that within the scope of the appended claims, the invention may be practiced otherwise than as specifically described herein.

The invention claimed is:

1. A magnetic flow meter, comprising:
a first spud end having a first wall thickness;
a second spud end having a second wall thickness;
a sensing area positioned between the first spud end and the second spud end, and the sensing area has a third wall thickness that is thinner than the first wall thickness and the second wall thickness;
electrodes positioned in the sensing area; and
graphite plugs exposed to an interior of the sensing area, and each of the graphite plugs is ionic salt impregnated, wherein one of the electrodes is inserted in each of the graphite plugs.

2. The magnetic flow meter according to claim 1, wherein the third wall thickness of the sensing area is equal to or less than half of the first wall thickness of the first spud end.

3. The magnetic flow meter according to claim 1, wherein the third wall thickness of the sensing area is equal to or less than half of the second wall thickness of the second spud end.

4. The magnetic flow meter according to claim 1, wherein an inner diameter of the flow meter continuously decreases from the first spud end to the sensing area and continuously increases from the sensing area to the second spud end.

5. The magnetic flow meter according to claim 1, wherein a first end of each of the graphite plugs is exposed to the interior of the sensing area, a second end of each of the graphite plugs includes one of the electrodes inserted therein, and a diameter of the second end of each of the graphite plugs is larger than a diameter of the first end.

6. The magnetic flow meter according to claim 1, wherein the first spud end, the second spud end, and the sensing area include a polyphenylene sulfide alloy.

7. The magnetic flow meter according to claim 1, wherein inside surfaces of the first spud end, the second spud end, and the sensing area are finished with a polyphenylene sulfide alloy.

8. The magnetic flow meter according to claim 1, wherein the graphite plugs are positioned between an inside of the sensing area and the electrodes such that the electrodes are not in direct contact with liquid flowing inside the sensing area.

9. The magnetic flow meter according to claim 1, wherein the graphite plugs are 3 mm thick.

10. The magnetic flow meter according to claim 1, wherein each of the electrodes includes a pin and each of the pins is conversion coated to include a layer of silver chloride.

11. The magnetic flow meter according to claim 1, wherein the ionic salt impregnated throughout the graphite plugs is potassium chloride.

12. A magnetic flow meter, comprising:
   a first spud end having a first wall thickness;
   a second spud end having a second wall thickness;
   a sensing area positioned between the first spud end and the second spud end, and the sensing area has a third wall thickness that is thinner than the first wall thickness and the second wall thickness;
   electrodes positioned in the sensing area;
   a register including a battery, a printed circuit board assembly, and a display device;
   a tube gasket positioned between the register and the sensing area; and
   a printed circuit board to connect the electrodes to the printed circuit board assembly of the register,
   wherein the printed circuit board passes through a slit in the tube gasket and the tube gasket is compressed to hermetically seal the register.

13. The magnetic flow meter according to claim 12, further comprising:
   a center pin positioned inside the tube gasket; and
   a register cup positioned outside the tube gasket,
   wherein a drive pin is driven into the center pin to expand the center pin and compress the tube gasket between the center pin and the register cup to hermetically seal the register.

14. The magnetic flow meter according to claim 12, further comprising:
   a center pin positioned inside the tube gasket; and
   a register cup positioned outside the tube gasket,
   wherein the register cup is crimped to compress the tube gasket between the center pin and the register cup to hermetically seal the register.

* * * * *